(12) United States Patent
Mangtani et al.

(10) Patent No.: US 9,268,562 B1
(45) Date of Patent: Feb. 23, 2016

(54) METHODS AND APPARATUSES FOR DYNAMICALLY GENERATING MOBILE APPLICATION LAYOUTS USING CLIENT-INDEPENDENT CONFIGURATION

(71) Applicant: PredictSpring, Inc., Los Altos, CA (US)

(72) Inventors: Nitin Mangtani, Los Altos, CA (US); Jeff Schumacher, San Jose, CA (US); Sandilya Garimella, San Jose, CA (US)

(73) Assignee: PredictSpring, Inc., Los Altos, CA (US)

( * ) Notice: Subject to any disclaimer, the term of this patent is extended or adjusted under 35 U.S.C. 154(b) by 0 days.

(21) Appl. No.: 14/601,847

(22) Filed: Jan. 21, 2015

(51) Int. Cl.
*G06F 9/44* (2006.01)

(52) U.S. Cl.
CPC ........................................ *G06F 8/71* (2013.01)

(58) Field of Classification Search
CPC .......................................................... G06F 8/71
USPC ......................................................... 717/121
See application file for complete search history.

(56) References Cited

U.S. PATENT DOCUMENTS

| | | | | |
|---|---|---|---|---|
| 6,430,609 | B1 * | 8/2002 | Dewhurst ............ | G06F 17/5018 709/220 |
| 7,380,212 | B2 * | 5/2008 | Cody .................... | G06Q 10/107 715/752 |
| 7,552,222 | B2 | 6/2009 | Garimella et al. | |
| 8,261,231 | B1 * | 9/2012 | Hirsch ...................... | G06F 8/20 709/201 |
| 8,340,633 | B1 * | 12/2012 | Rege ........................ | H04W 4/26 455/405 |
| 8,341,516 | B1 * | 12/2012 | Mason .............. | G06F 17/30899 715/238 |
| 8,412,623 | B2 | 4/2013 | Moon et al. | |
| 8,539,544 | B2 | 9/2013 | Garimella et al. | |
| 8,606,635 | B2 | 12/2013 | Evankovich et al. | |
| 8,898,748 | B2 | 11/2014 | Burks et al. | |
| 8,954,950 | B2 * | 2/2015 | Ionfrida ................. | G06Q 30/02 717/120 |
| 8,978,006 | B2 * | 3/2015 | Hirsch et al. .............. | G06F 8/71 717/107 |
| 9,042,862 | B2 | 5/2015 | Rege et al. | |
| 2004/0010462 | A1 | 1/2004 | Moon et al. | |
| 2006/0150178 | A1 * | 7/2006 | Jerrard-Dunne .......... | G06F 8/71 717/168 |
| 2009/0249374 | A1 * | 10/2009 | Hepper ............... | G06F 17/3089 719/332 |
| 2010/0299719 | A1 * | 11/2010 | Burks .................. | G06F 9/44505 726/3 |
| 2012/0095828 | A1 * | 4/2012 | Evankovich ........... | G06Q 10/00 705/14.49 |
| 2013/0218698 | A1 | 8/2013 | Susan Moon et al. | |
| 2013/0238983 | A1 | 9/2013 | Christopher Mason et al. | |
| 2013/0247005 | A1 * | 9/2013 | Hirsch ....................... | G06F 8/71 717/121 |

(Continued)

FOREIGN PATENT DOCUMENTS

WO      2015088548 A1    6/2015

*Primary Examiner* — Don Wong
*Assistant Examiner* — Theodore Hebert
(74) *Attorney, Agent, or Firm* — Cooley LLP

(57) ABSTRACT

The methods and apparatuses disclosed herein generally relate to optimizing the creation and loading of application interface layouts by providing a platform for generating configuration files for mobile applications. A mobile configuration file can allow a developer to update an application layout, and for the application to render updated layouts, without any need to alter the underlying code of the application after it has been installed on the a client device. A mobile workbench receives drag-and-drop layout definition input from a developer, and creates a mobile configuration file based on the developer's input. The mobile workbench can then dynamically update the mobile configuration file as the developer updates the application layout. The developer and/or the mobile workbench can send the updated application layout to mobile applications running on client devices, such that the client devices need not redownload the mobile application to render the updated application layout.

23 Claims, 12 Drawing Sheets

(56) References Cited

U.S. PATENT DOCUMENTS

2014/0282398 A1* 9/2014 Podolyak .................. G06F 8/71 717/121

2014/0282399 A1* 9/2014 Gorelik ..................... G06F 8/65 717/122

* cited by examiner

Figure 9

Features
1002
- [ ] Barcode Scan
- [ ] Save Picture
- [ ] Notifications
- [x] Search as you type
- [x] Search refinements
- [x] Product Ratings
- [ ] Audio Search
- [ ] Geofences

Figure 10

METHODS AND APPARATUSES FOR DYNAMICALLY GENERATING MOBILE APPLICATION LAYOUTS USING CLIENT-INDEPENDENT CONFIGURATION

BACKGROUND

Mobile applications are widely used as a way of providing data to consumers who frequently or primarily use mobile devices as a way to perform functions such as buying products, obtaining information, and/or other such actions. Known mobile applications are generated with client-specific code. However, when a mobile application developer wants to update the mobile application (e.g., if the layout of the mobile application is to be updated), the mobile application developer typically updates the client-specific code of the mobile application to facilitate such a change. This can be time-consuming and costly for developers, as developers often create multiple applications for multiple clients (e.g., multiple mobile applications for multiple mobile platforms, and/or for multiple operating systems). Additionally, updating the code for a mobile application can involve submitting the updated code to a mobile application publisher for review, which can add additional cost and additional time to the development schedule.

SUMMARY

The methods and apparatuses disclosed herein generally relate to providing a platform for generating platform-agnostic configuration files for mobile applications, also known as apps. A platform-agnostic configuration file can be used to specify the layout of a mobile application without any need to alter the underlying code of the mobile application after it has been installed on the a client device. A developer can use a drag-and-drop interface to define a mobile configuration file that can be interpreted by the mobile application. The developer can further edit the mobile configuration file and send it to client devices running the mobile application to update components of the mobile application, such as the mobile application layout. This can reduce the amount of development time used to update mobile applications, can decrease the amount of data and/or time used to update a mobile application, and/or can eliminate the need to submit configuration updates (e.g., such as layout updates) through a mobile application publisher for code review.

BRIEF DESCRIPTION OF THE DRAWINGS

The drawings are not necessarily to scale; in some instances, various aspects of the disclosure herein may be shown exaggerated or enlarged in the drawings to facilitate an understanding of different features. In the drawings, like reference characters generally refer to like features (e.g., functionally similar and/or structurally similar elements).

FIG. 9 is a screenshot diagram illustrating editing the layout of a mobile application using the mobile workbench, according to an embodiment.

FIG. 10 is a screenshot illustrating feature toggling for a mobile application, according to an embodiment.

DETAILED DESCRIPTION

Figure 1:
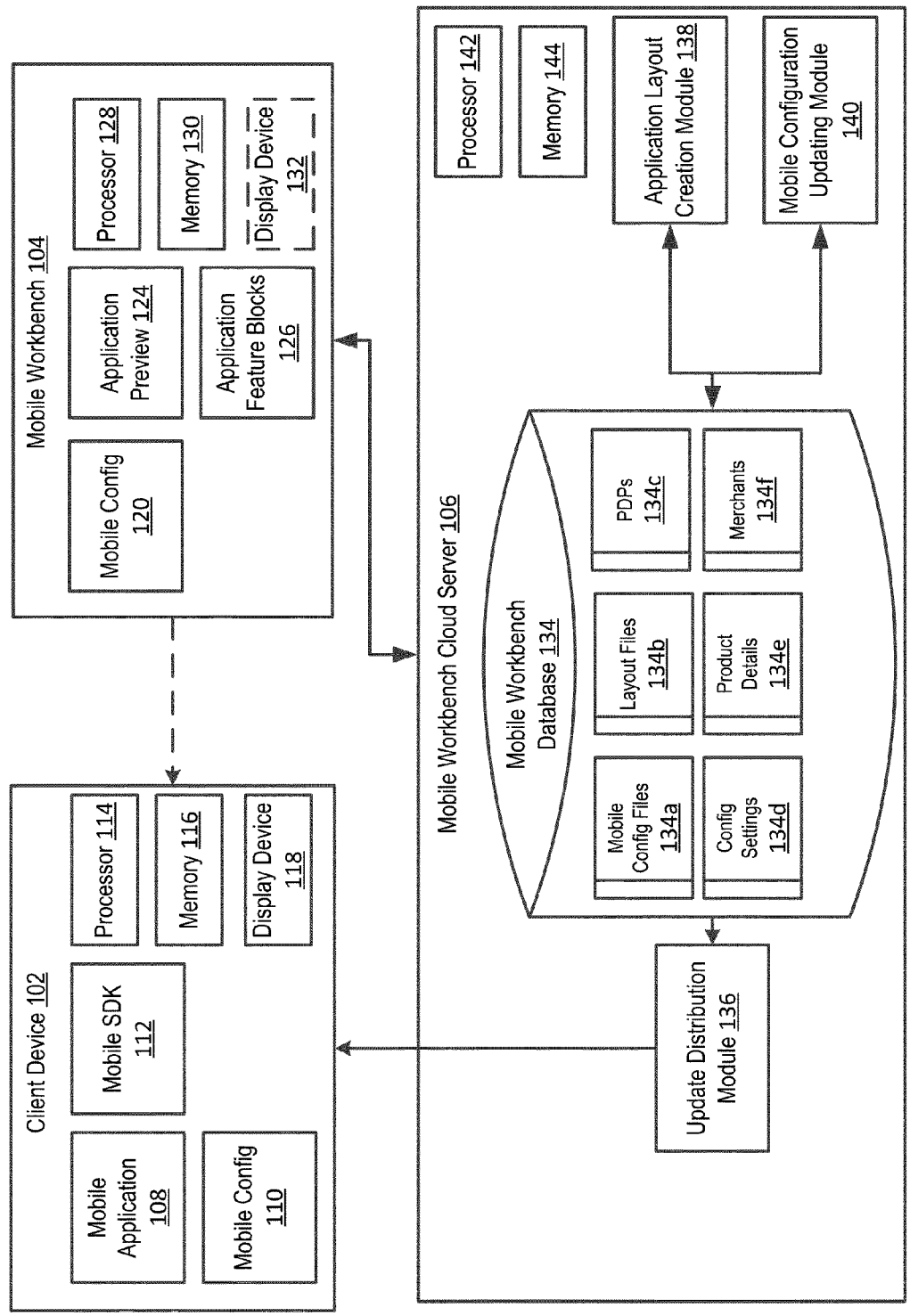
FIG. 1 is a schematic diagram illustrating a mobile workbench, a server, and a client device, according to an embodiment.

Described herein are various methods and apparatuses for creating and editing mobile application layouts. In some implementations, a developer can use a mobile workbench to construct a mobile application layout for a mobile application. The developer can use drag-and-drop and/or menu options to define the mobile application layout. The mobile workbench can generate a mobile configuration file based on the developer's input, and can store the mobile configuration file in a database. A developer can subsequently update the mobile application layout through the workbench, causing the mobile workbench to dynamically and automatically update the stored mobile configuration file for the mobile application. The developer and/or the mobile workbench can then distribute the mobile configuration file to mobile applications that have not received updated mobile configuration files. Mobile configuration files can be developed, installed, and updated separately from mobile applications, such that updating the mobile configuration file can cause no changes to the corresponding mobile application. For example, updating the mobile configuration file may not affect the underlying code in the mobile application. The mobile application can be configured to determine how to render its layout by processing a mobile configuration file provided to the mobile application when the mobile application is installed, when the mobile application is initiated and/or shut down, and/or under similar circumstances.

An example method for rendering a mobile application executing on a mobile device includes receiving a notification from a mobile application indicating that the mobile application has been initiated, and extracting application identification information from the notification. The example method also includes retrieving at least one platform-agnostic mobile application configuration data structure from a memory based on the application identification information, the at least one mobile application configuration data structure including platform-agnostic mobile application layout settings data and a platform-agnostic layout settings executable object, and the platform-agnostic mobile application configuration data structure being configured to instruct the mobile application to render a graphical user interface on a display of a mobile device based on the platform-agnostic mobile application layout settings data and execution of the platform-agnostic layout settings executable object. The example method also includes sending the at least one platform-agnostic mobile application configuration data structure to the mobile application so as to cause mobile device to render the graphical user interface on the display according to the at least one platform-agnostic mobile application configuration data structure.

In the example method, sending the at least one at least one platform-agnostic mobile application configuration data structure to the mobile application can cause the mobile device to render the graphical user interface by instructing the mobile application to access the at least one platform-agnostic mobile application configuration data structure. Further, the example method can cause the mobile device to render the graphical user interface without altering code implementing the mobile application when the at least one platform-agnostic mobile application configuration data structure is sent to the mobile application.

In the example method, the at least one platform-agnostic mobile application configuration data structure can include multiple layouts and multiple configuration settings. The platform-agnostic layout settings executable object can be a JavaScript Object Notation (JSON) object executable by the mobile application. The platform-agnostic layout settings executable object can specify at least one of settings and/or features of the mobile application. The settings can include at least one of color settings, image display settings, font settings, search layout settings, grid layout settings, shopping cart settings, and/or update settings. The features of the mobile application can be specified via feature flags in the platform-agnostic layout settings executable object, and can include at least one of a barcode feature, a save picture feature, a notifications feature, a search refinement feature, a ratings feature, a geofencing feature, a wishlist creation and management feature, a checkout feature, and/or a store locator feature.

In the example method, the notification is a first notification and the mobile application is a first instance of the mobile application. The example method can also include receiving a second notification from a second instance of the mobile application indicating that the second instance of the mobile application has been initiated, extracting a configuration data structure version identifier from the second notification, retrieving at least one platform-agnostic mobile application configuration data structure from a memory based on the configuration data structure version identifier, and sending the at least one platform-agnostic mobile application configuration data structure to the second instance of the mobile application.

In the example method, the platform-agnostic layout settings data can include Operating System mapping settings.

The example method also includes receiving a request to modify the platform-agnostic layout settings executable object from a mobile workbench, extracting from the request at least one setting or feature modification for at least one setting or feature, modifying the at least one setting or feature within platform-agnostic layout settings executable object code, using the at least one setting or feature modification extracted from the request, to define a modified platform-agnostic mobile application configuration data structure, the modified platform-agnostic mobile application configuration data structure configured to instruct the mobile application to render a modified graphical user interface on a display of the mobile device based on the platform-agnostic mobile application layout settings data and execution of the platform-agnostic layout settings executable object, and sending the modified platform-agnostic mobile application configuration data structure to the mobile application.

In the example method, the modified platform-agnostic mobile application configuration data structure is configured to instruct the mobile application to render the modified graphical user interface on a display of the mobile device when the mobile application is initiated. Further, the modified platform-agnostic mobile application configuration data structure is configured to instruct the mobile application to refresh the graphical user interface such that the mobile application renders the modified graphical user interface on a display of the mobile device.

Another example method for rendering a mobile application executing on a mobile device includes receiving a request to modify a mobile application configuration file for a mobile application from a mobile workbench executed on an administrative device, and extracting from the request at least one layout modification for the mobile application configuration file, and application identification information. The example method can further include retrieving mobile application configuration file information from a memory based on the application identification information, the at least one mobile application configuration file information including mobile application layout settings data and a mobile application layout settings executable object. The example method can further include modifying at least one of the mobile application layout settings data and the mobile application layout settings executable object, using the layout modification extracted from the request, to define a modified mobile application configuration file, the modified mobile application configuration file configured to instruct a mobile application to render a graphical user interface on a display for a mobile device based on the layout modification without altering the code in the mobile application.

The example method can also include distributing the modified mobile application configuration file to multiple mobile devices. Each mobile device from the plurality of mobile devices includes an installed copy of the mobile application. The example method can also include receiving a signal from the mobile workbench cloud server to distribute the modified mobile application configuration file to multiple mobile devices, and distributing the modified mobile application configuration file to the plurality of mobile devices.

The example method can also include sending the modified mobile application configuration file to the mobile workbench. The mobile workbench can include an interface configured to receive layout modifications from a mobile application administrator. The modified mobile application configuration file can be configured to instruct the mobile application to render a graphical user interface for the mobile application when the mobile application is initiated on a client device. In the example method, the graphical user interface is a second graphical user interface, and the modified mobile application configuration file can be configured to instruct the mobile application to render the second graphical user interface on the display of the mobile device after a first graphical user interface is refreshed.

Another example method for rendering a mobile application executing on a mobile device includes displaying multiple graphical representations of feature blocks within a mobile workbench, and receiving an indication that an administrator has selected at least one of multiple graphical representations of feature blocks. It can also include sending the at least one of multiple graphical representations of feature blocks and a platform identifier to a server so as to cause the server to generate a mobile application for distribution on a mobile platform corresponding to the platform identifier via encapsulating code within the at least one of multiple graphical representations of feature blocks in a mobile application executable object configured to run on the mobile platform. Further, the example method can include generating a mobile application configuration data structure based on the administrator's selections, and sending the mobile application configuration data structure to the server. The method can further include receiving a request from the administrator to modify the mobile application configuration data structure for the mobile application executable object, and extracting, from the request, at least one layout modification for at least one mobile application configuration data structure element. The method can further include modifying the mobile application configuration data structure, using the layout modification extracted from the request, to define a modified mobile application configuration data structure, the modified mobile application configuration data structure configured to instruct a mobile application to render a graphical user interface on a display for a mobile device based on the layout modification and without altering the code in the mobile application executable object. It should be appreciated that all combinations of the foregoing concepts and additional concepts discussed in greater detail below (provided such concepts are not mutually inconsistent) are contemplated as being part of the disclosure herein. In particular, all combinations of claimed subject matter appearing at the end of this disclosure are contemplated as being part of the disclosure herein. It should also be appreciated that terminology explicitly employed herein that also may appear in any disclosure incorporated by reference should be accorded a meaning most consistent with the particular concepts disclosed herein.

Mobile Applications and Mobile Devices

FIG. 1 is a schematic diagram illustrating a client device 102, a mobile workbench 104, and a mobile workbench cloud server 106. For example, in some implementations, a client device 102 can be a physical hardware device including at least one memory 116, at least one processor 114, and at least one display device 118 (e.g., a liquid-crystal (LCD) display screen, and/or a similar display device). The client device 102 can be a personal computer (e.g., a laptop, and/or a like personal computing device), a mobile device (e.g., a smartphone and/or similar mobile phone device (e.g., running an Operating System such as, but not limited to, iOS, Android, Windows Phone 8, Blackberry OS, and/or similar Operating Systems), a tablet, a personal digital assistant (PDA), wearable devices (e.g., smart watches, augmented reality vision devices, and/or similar devices), and/or a similar mobile device), and/or a similar device. The client device 102 can install a mobile application 108, e.g., from a vendor and/or a similar developer. The client device 102 can also store mobile configuration files 110 (described in more detail in FIG. 2) and a form of a mobile software development kit (mobile SDK) 112.

The mobile application 108 can allow a user operating the client device 102 to, for example, view a mobile store and/or catalogue interface for a merchant's products, to purchase and/or view products offered by the merchant, and/or to access other information on another entity's web page. The mobile application's layout 108 can be defined using a mobile workbench 104 and can be configured to work on a number of device operating systems and/or mobile platforms (including but not limited to Android platform, iOS, Windows Phone, and/or like platforms).

The mobile application 108 can interact with the mobile configuration file 110 to determine how to organize data within the mobile application 108 and/or to determine particular features to include within the mobile application 108. For example, the mobile configuration file 110 can contain layout information (e.g., color information, font family and font size information, and/or similar information), and/or can contain feature flags corresponding to particular features (e.g., a shopping cart, a search feature, and/or similar features) that the mobile application may implement. The mobile configuration file can also be referred to as a mobile application configuration data structure and/or a mobile application configuration file. The mobile configuration file can be platform-agnostic (e.g., the mobile configuration can be used by applications running on multiple mobile platforms, and does not require translation between mobile platforms). The mobile configuration file is described further in at least FIG. 2.

The mobile application 108 can also use the mobile SDK 112 in conjunction with the mobile configuration file 110 to determine how to render and/or otherwise implement both the mobile application layout, as well as features within the mobile application 108. The mobile SDK 112 can include information on how to implement features for each particular operating system and/or mobile platform, how to implement features specified in the mobile configuration file 110, and/or other information. In some implementations, for example, the mobile application 108 can use the mobile SDK 112 to create a nested tree data structure from the mobile configuration file 110, such that the mobile application 108 can determine more quickly how particular components of the mobile application layout should be rendered. The mobile application 108 can then traverse the nested tree when the mobile application 108 is rendering a particular mobile application page, find the relevant layout data, and render the page according to the layout information in the mobile configuration file 110. In some implementations, the mobile application 108 can find the relevant layout data by using an action Uniform Resource Locator (URL) address, which can specify the particular node in the nested tree to access for rendering the mobile application page. The mobile application 108 can receive this action URL from the mobile workbench cloud server 106, e.g., when a user interacts with the mobile application 108 such that a new mobile application page is loaded. The mobile SDK 112 is described in further detail in at least FIG. 7.

Mobile Workbench and Mobile Workbench Cloud Server

The mobile application layout may be defined by the mobile workbench 104. The mobile workbench 104 can, in some implementations, be a hardware component (e.g., a developer and/or administrative device, including but not limited to a laptop and/or desktop personal computer, and/or a mobile device such as a tablet, smartphone, PDA, and/or a similar device used by the developer) including at least one processor 128, at least one memory 130, and software that instructs the mobile workbench 104 to perform multiple functions (such as creating and/or editing mobile applications, and/or related functions). The mobile workbench 104 can also include a display device 132, e.g., for viewing previews of mobile application layouts being developed at the mobile workbench 104. The mobile workbench 104 can also, in other implementations, be a software component, e.g., hosted on a server (e.g., such as the mobile workbench cloud server 106) and/or installed on a developer computing device configured to perform the above functions. The mobile workbench 104 can also have access to mobile configuration file 120 corresponding to a mobile application layout being defined and/or updated within the mobile workbench 104. The mobile workbench can also include a mobile application preview window 124 which can facilitate previews of layouts and/or features that a developer elects to include in the mobile application 108.

Developers may define mobile application layouts within the mobile workbench 104 via a drag-and-drop interface, which allows them to drag application feature blocks 126 into an application editor portion of the mobile workbench 104. The mobile workbench 104 can use the feature blocks to determine how to construct the mobile application layout, and/or can inform the mobile workbench cloud server 106 how to construct the mobile application layout. Further details for the mobile workbench 104 are described in at least FIGS. 3-4.

The mobile workbench 104 can interact with a mobile workbench cloud server 106 to define and/or update mobile application layouts. The mobile workbench cloud server 106 can be implemented as a single server or a cluster of servers hosting a cloud data storage network. The mobile workbench cloud server 106 can include at least one processor 142, at least one memory 144, and at least one mobile workbench database 134.

The mobile workbench database 134 can include records for mobile configuration file records 134a, layout data structure records 134b, product detail page records 134c, configuration settings records 134d, product data records 134e, and merchant records 134f. The mobile configuration files records 134a can include records of past and/or recent mobile configuration files which have been defined by the mobile workbench 106. The layout file records 134b can include records of layouts included in a mobile configuration file. The product detail page records 134c can include records of layouts for displaying product details within the mobile application 108. The configuration settings records 134d (e.g., the mobile configuration data structure) can include records of features and/or color settings specified by a developer for the mobile application 108. The product data records 134e can include records of products being displayed and/or sold through the mobile application 108. The merchant records 134f can include records of merchants and/or other developers who have developed mobile application layouts using the mobile workbench 104.

The mobile workbench cloud server 106 can also include a mobile application layout creation module 138, a mobile configuration updating module 140, and an update distribution module 136. The mobile application layout creation module 138 can be configured to help define mobile application layouts based on data from the mobile workbench 104. The mobile configuration updating module 140 can be configured to update mobile configuration files stored in the mobile workbench database 134, e.g., based on data received from the mobile workbench 104. The update distribution module 136 can be configured to send updated mobile configuration files to client devices 102, which have the mobile application 108 corresponding to the mobile configuration files being distributed. Further details about the mobile workbench cloud server 106 can be found in at least FIGS. 3-4.

Mobile Configuration Files

Figure 2:
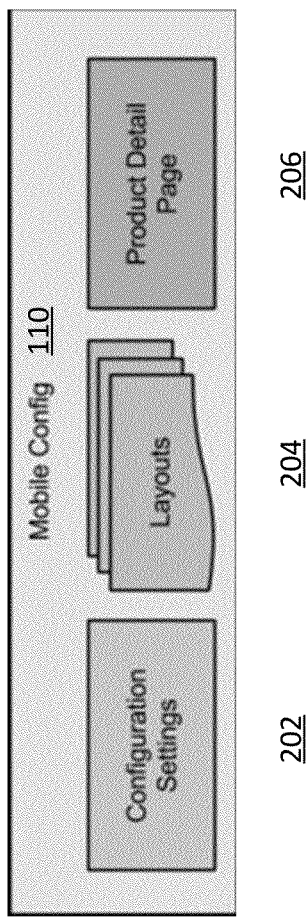
FIG. 2 is a schematic diagram illustrating a mobile configuration file, according to an embodiment.

FIG. 2 is a schematic diagram illustrating a mobile configuration file 110. In some implementations, a mobile configuration file can include at least three components: a configurations settings component 202, a set of layout data structures 204, and a product detail page (PDP) component 206. A mobile configuration file 110 can be stored in the mobile configuration file table 134a of the mobile workbench database 134. Configurations settings component 202 can also be referred to as a layout settings executable object. The configuration settings component 202 can be stored in the configuration settings table 134d of the mobile workbench database 134, and can include appearance and/or feature settings for a mobile application 108. For example, the configurations settings component 202 can include font and text and/or background color settings, and/or flags for features such a shopping cart and/or barcode scanning. Further feature flags can include but are not limited to: how often a mobile application 108 can check for an updated mobile configuration file, a feature for taking a picture of a product and adding the product to a wishlist, notifications, initiating searches as the user completes a search query, search filters and search criteria, providing ratings and reviews for products, searching for audio files within the mobile application 108, using geofencing to show notifications and/or otherwise perform actions related to businesses within the location (e.g., providing a notification to the user when the user is near a store with seasonal discounts, automatically opening a mobile application 108 for a merchant when the user is near one of the merchant's stores, and/or similar actions), a store locator feature, a checkout shopping cart (and/or a location where the user can be redirected to select and purchase products on the mobile application 108), and/or currencies (including but not limited to physical currencies such as United States dollars or the Euro and digital currencies such as bitcoins).

Color settings can include, but are not limited to: colors for action bar backgrounds and action bar text (where action bars can be an upper portion of the mobile application 108, which allows the user to navigate, view a title for, and perform page-level actions on, a page within the mobile application 108), background and text colors for mobile application tabs, background colors and text colors for primary and secondary buttons within the mobile application 108, text color for list prices for products shown in the mobile application 108, and/or text color for sales prices shown in the mobile application 108. Font settings can include, but are not limited to: default fonts, header fonts, and display text fonts for each platform for which a mobile application 108 can be installed.

Application layout features can include, but are not limited to: an identifier for a layout to be shown when a search query does not have any results (e.g., a layout for a list of related products and/or related sales), whether search results are shown as a grid or a list, the dimensions of the grid in which search results are shown, if the grid option is selected, whether or not a wishlist is activated (e.g., as a tab, as an option in a mobile application's "More" menu, and/or as an option in an action bar), displaying text in the grid cells of the layout, if the search results are displayed in a grid, whether the action bar should have a light or dark background (and/or whether the action bar icons should be dark or light, respectively), whether images should be scaled, cropped, and/or otherwise modified to fit within the layout, where a store locator option should be located, e.g., if the feature is activated (e.g., within a tab section, in a navigation bar for the mobile application 108, and/or the position in the tab section and/or in the navigation bar that the store locator option should inhabit, and/or other such information), the icon and/or title to be provided for the store locator option, if the option is activated, a location for a shopping cart in the mobile application 108 (e.g., in the navigation bar, in a tab section, and/or a similar location), a position in the tab section and/or the navigation bar for the shopping cart, an icon and/or title for the shopping cart option, and/or links to miscellaneous pages and/or data to be shown within the mobile application 108 (including but not limited to privacy policy, terms of service, and/or merchant contact information pages).

Tab feature settings can include, but are not limited to the position of a tab section (e.g., at the top, bottom, and/or side of the mobile application window), a title for the tab section, icons to use for the tab section, and/or other layout information to provide to the mobile application 108 for rendering the tab section.

An example configuration settings file may take a form similar to the following:

"MobileConfigJSON": "{\"MobileConfigName\":\"Active Config\",\"ActionBarColor\": {\"r\":255,\"g\":255, \"b\":255,\"a\":1},\"ActionBarTextColor\":{\"r\":0,\"g\":0,\"b\":0,\"a\":1},\"TabColor\":{\"r\":255,\"g\":255,\"b\":255,\"a\":1},\"TabTextColor\":{\"r\":0,\"g\":0,\"b\":0,\"a\":1},\"PrimaryButtonColor\":{\"r\":23,\"g\":42,\"b\":71,\"a\":1},\"PrimaryButtonTextColor\":{\"r\":255,\"g\":255,\"b\":255,\"a\":1},\"SecondaryButtonColor\":{\"r\":14,\"g\":31,\"b\":57,\"a\":1},\"SecondaryButtonTextColor":{\"r\":255,\"g\":255,\"b\":255,\"a\":1},\"ListPriceTextColor\":{\"r\":119,\"g\":119,\"b\":119,\"a\":1},\"SalesPriceTextColor\":{\"r\":23,\"g\":42,\"b\":71,\"a\":1},\"ProductTemplate\":\"DROP_SHADOW\",\"ProductDetailLayoutID\":\"\",\"NoSearchResultsLayoutID\":\"544ff48e-4ea4-4557-a4f1-459ef7510253\",\"DefaultSearchLayout\":\"GRID\",\"SearchLayoutGridType\":\"TWO_COLUMN\",\"Percentage\":\"100\",\"UpdateTimeSeconds\":\"120\",\"HasBarcodeScan\":false,\"HasSavePicture\":false,\"HasNotifications\":false,\"HasSearchAsYouType\":true,\"HasSearchRefinements\":true,\"HasRatingsV1\":true,\"HasAudioSearch\":false,\"HasGeofencing\":false,\"HasWishlistTab\":true,\"HasWishlistMenu\":true,\"HasWishlistActionBar\":true,\"HasEntityCellText\":true,\"HasDarkBackground\":false,\"ImageFitMode\":\"CENTER_FIT\",\"AndroidFont\":\"Roboto\",\"AndroidLayoutCellHeaderTextFont\":\"Roboto\",\"AndroidLayoutCellDisplayTextFont\":\"Roboto\",\"IOSFont\":\"Sofia Pro\",\"IOSLayoutCellHeaderTextFont\":\"HelveticaNeue\",\"IOSLayoutCellDislayTextFont\":\"HelveticaNeue\",\"HasStoreLocator\":true,\"StoreLocatorContainer\":\"NAV_BAR\",\"StoreLocatorPosition\":\"1\",\"StoreLocatorIcon\":\"\",\"StoreLocatorTitle\":\"\",\"CheckoutType\":\"HYBRID_BACKEND\",\"UrlCheckout\":\"\",\"HasBitcoin\": false,\"HasCheckout\":true,\"CartContainer\":\"NAV_BAR\",\"CartPosition\":\"2\",\"CartIcon\":\"\",\"CartTitle\":\"Cart\",\"Urls\":[{\"key\":\"ContactUs\",\"value\":\"http://m.MERCHANT1234.COM/customer-service\"}]}"

Figure 12:
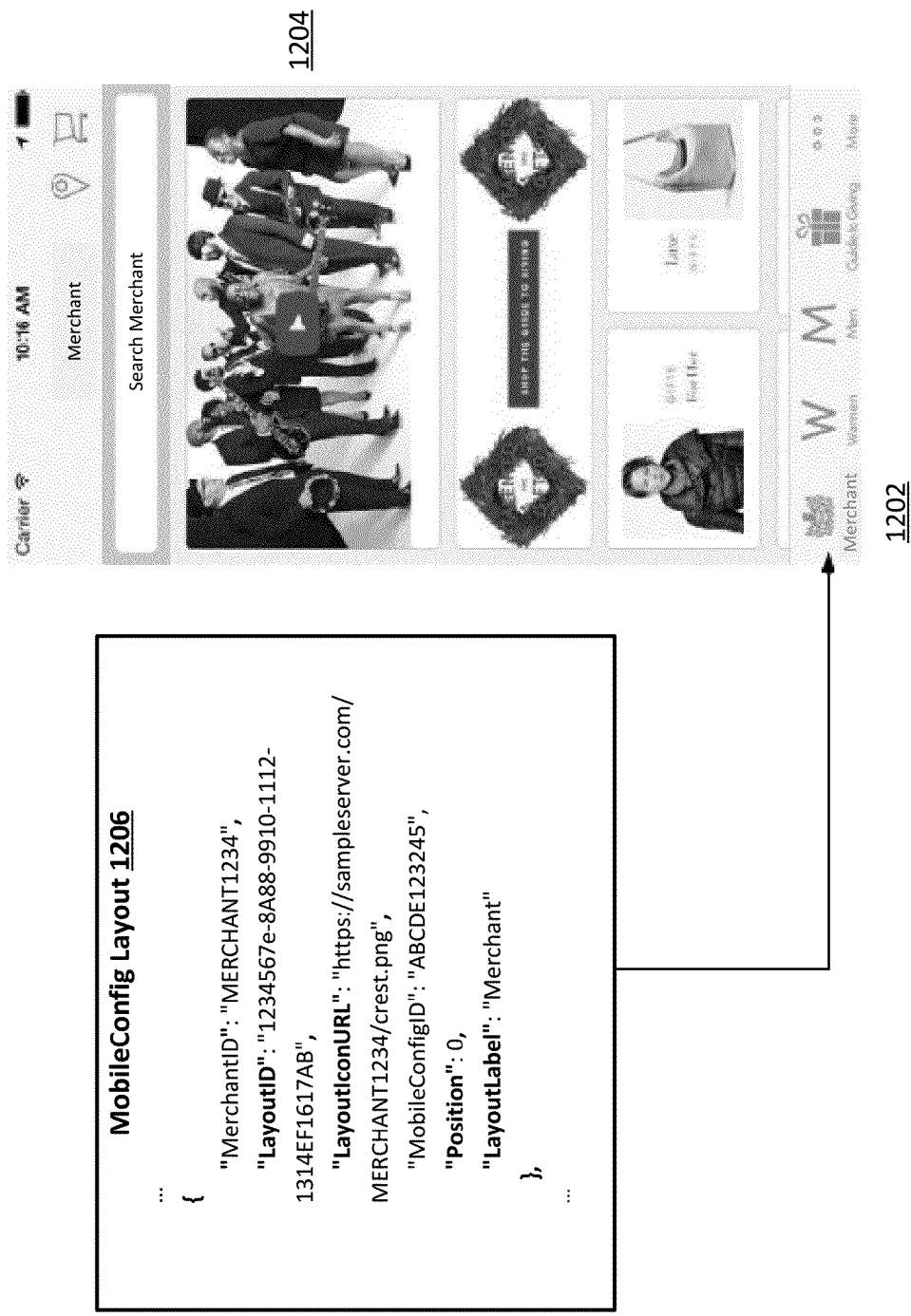
FIG. 12 is a screenshot illustrating layout data for a mobile application, according to an embodiment.

The set of layout data structures 204 (also referred to as mobile application layout settings data) can each specify layout settings for particular tab screens in the mobile application 108. For example, as shown in FIG. 12, a tab 1202 within the tab section may display a particular page 1204 within the mobile application 108. A layout data structure 1206 can specify at least some layout settings for the particular page 1204, including but not limited to an identifier for the layout data structure, an identifier for the particular merchant for which the mobile application 108 was developed, an identifier for a mobile configuration file and/or data structure associated with the layout, addresses for icons (e.g., for the tab, and/or for portions of the page 1204), titles and/or other labels for the page, Operating System (OS) mapping settings for the layout (e.g., for what platform and/or OS the layout will be rendered), and/or positions of various components of the layout. Each tab and/or page within the mobile application 108 can have a corresponding layout data structure 1206. Returning to FIG. 2, each layout data structure 204 can be implemented as an Extensible Markup Language (XML) and/or JSON data structure stored in the layout files table 134b of the mobile workbench database 134. An example layout data structure 204 including at least some of the above information can take a form similar to the following:

"MobileConfigLayout": [
{
  "MerchantID": "MERCHANT1234",
  "LayoutID": "1234567e-8A88-9910-1112-1314EF1617AB",
  "LayoutIconURL": "https://sampleserver.com/MERCHANT1234/crest.png",
  "MobileConfigID": "ABCDE123245",
  "Position": 0,
  "LayoutLabel": "Home"
},
{
  "MerchantID": "MERCHANT1234",
  "LayoutID": "1234567e-8A88-9910-1112-1314EF1617AB",
  "LayoutIconURL": "https:// sampleserver.com MERCHANT1234/W2.png",
  "MobileConfigID": "ABCDE123245",
  "Position": 1,
  "LayoutLabel": "Women"
},
]

The product detail page component 206 can be a component of the layout which specifies how product information can be stored within the application. Such information can include, but is not limited to, product prices, product images, product descriptions, product availability, product reviews and/or ratings, similar products, and/or similar product information. The mobile configuration file can include one or more product detail pages. Product detail page data structures can be stored in the product detail page table 134c of the mobile workbench database 134. An example layout data structure 206 including at least some of the above information can take a form similar to the following:

"window": {
  "defaults": {
    "textColor": {
      "g": 232,
      "b": 234,
      "r": 4
    },
    "borderColor": {
      "g": 230,
      "b": 230,
      "r": 230
    },
    "textFont": "HelveticaNeuve",
    "cornerRadius": 0,
    "textSize": "medium",
    "borderWidth": 0
  },
  "backgroundColor": {
    "g": 230,
    "b": 230,
    "r": 230
  },
  "titleImage": "some image url",
  "width": 320,
  "pageTitle": "Product Detail",
  "textType": "regular"
}

Creating a Mobile Application with the Mobile Workbench

Figure 3:
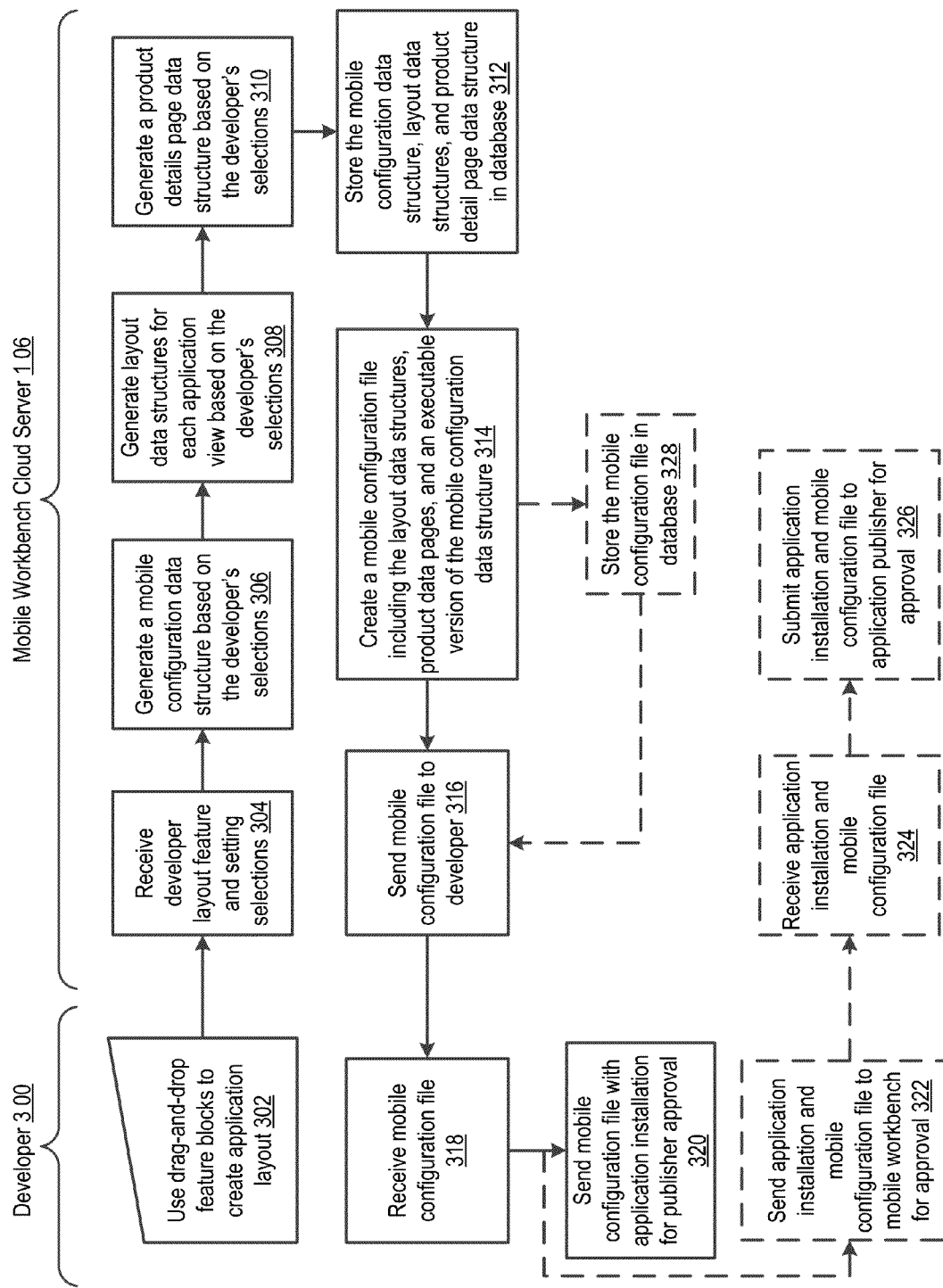
FIG. 3 is a logic flow diagram illustrating creating a mobile application, according to an embodiment.

FIG. 3 is a logic flow diagram illustrating creating a mobile application 108. For example, in some implementations, a developer 300 can use drag-and-drop feature blocks, and/or a similar graphical programming interface within a mobile workbench 104, to define 302 an application layout. For example, each of the feature blocks can correspond to a feature and/or setting that can be encapsulated within a mobile configuration file, such as layout settings, features which can be included within the layout, and/or other such settings.

Figure 8:
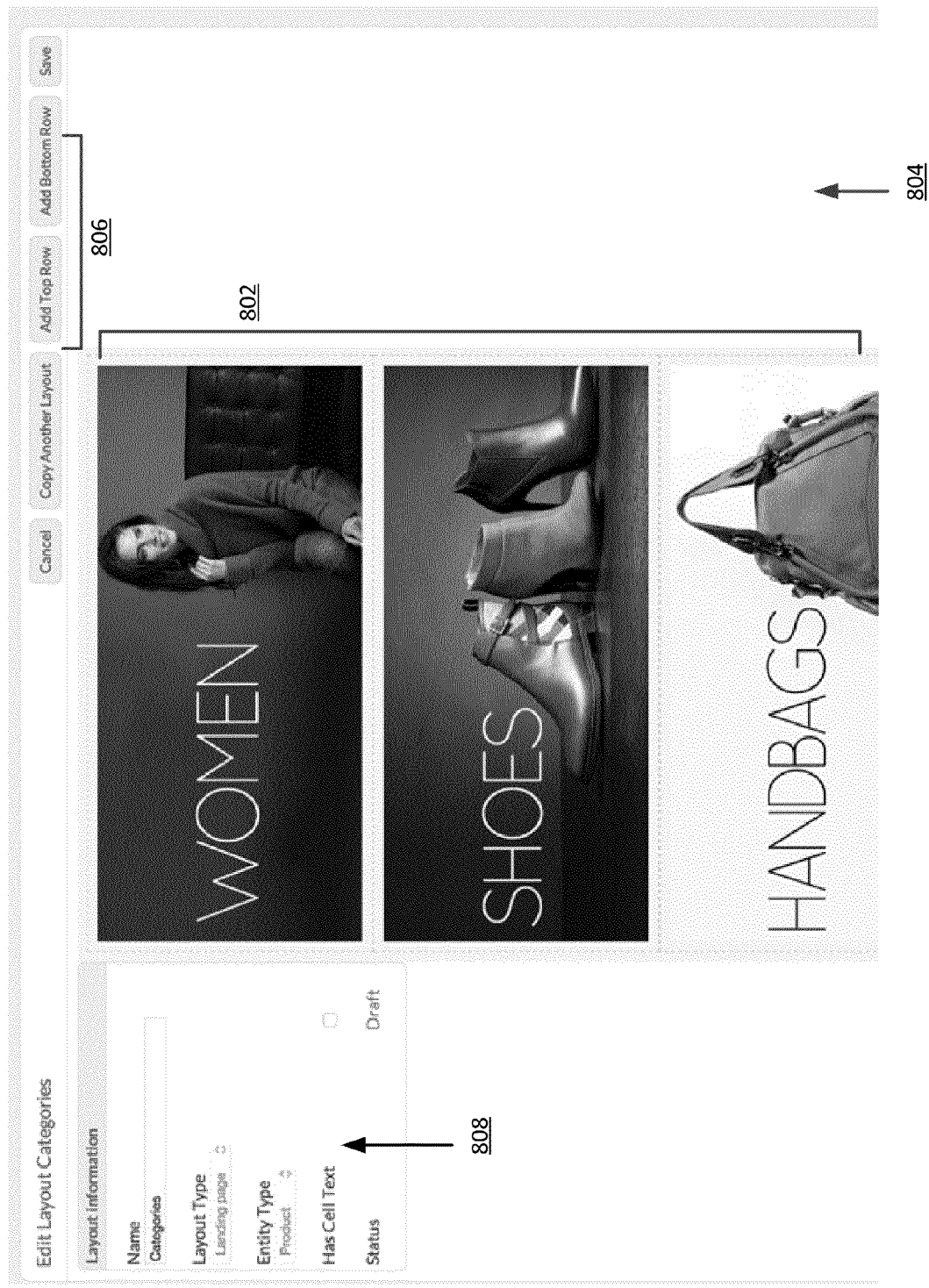
FIG. 8 is a screenshot diagram illustrating creating a mobile application using the mobile workbench, according to an embodiment.

For example, referring to FIG. 8, in some implementations the mobile workbench 104 may allow a developer to drag and drop section and/or image object feature blocks 802 into an application preview window 804. The developer can also select other options to be included in the layout as well, including adding rows and columns 806, editing global layout information 808 (e.g., the name of the layout, the tab for which the layout belongs, and/or other such features), and/or toggling feature flags and/or editing layout settings (e.g., such as the features 1002 in FIG. 10). Dragging and editing various features in the mobile workbench 104 can affect the mobile configuration file 120 being created by the mobile workbench 104. The developer can also copy portions of previously-created layouts, and/or complete layouts into the mobile workbench 104 to incorporate into a new mobile application layout, and/or can save mobile application layouts as the developer.

Returning to FIG. 3, the mobile workbench 104 can receive 304 the developer's layout feature and setting selections and, as the developer defines her mobile application layout, and/or after the developer has completed and saved her mobile application layout, can generate data structures used to construct a mobile configuration file for the developer's mobile application 108 to use in rendering the mobile application layout. For example the mobile workbench 104 can generate 306 a mobile configuration data structure 120, e.g., based on the developer's drag-and-drop activity, toggled options, and/or other selections and/or edits through the mobile workbench 104. The mobile workbench 104 can use similar data to generate 308 layout data structures for each application view, and to generate 310 at least one product details page data structure. In some implementations each data structure may be defined via creating a data structure in memory including particular layout option variables (e.g., corresponding to options which are included in and/or elected for the mobile application layout), and updating values for each of the variables as the developer defines and/or specify layout features and/or settings. The data structures can be stored 312 in the mobile workbench database 134.

The mobile workbench cloud server 106 can then use the data structures to define 314 a mobile configuration file. For example, the mobile workbench cloud server 106 can define an executable JSON and/or similar data object to include within the mobile configuration file, which can be executed by the mobile application 108 when the mobile application 108 accesses the mobile configuration file. Each data structure can then be incorporated into an aggregated data structure included in the mobile configuration file. The database can store 328 this mobile configuration file in the mobile workbench database 134, and can send 316 a copy of the mobile configuration file to the developer. In some implementations, the mobile workbench cloud server 106 can keep the file in memory and dispose of the file after sending 316 the mobile configuration file to the developer.

The developer can receive 318 the mobile configuration file, and can distribute the file to users in one of several ways. For example, when the developer publishes her mobile application 108 (and/or submits the mobile application 108 to be approved by a mobile application publisher), the developer can send 320 the defined mobile configuration file with an application installation file to users and/or to the mobile application publisher (e.g., for publisher approval). The application installation file can be a file the developer defines outside of the workbench, and may include the mobile application 108 that the developer has defined. The mobile application 108 can then use the mobile configuration file to determine how to render portions of the mobile application 108 (e.g., see at least FIG. 7 for more details).

In other implementations, the developer can send 322 her application installation file, mobile configuration file, and/or other information to the mobile workbench 104, such that the mobile workbench 104 can automatically submit the application and mobile configuration file for approval. The mobile workbench cloud server 106 can receive 324 the application installation file and the mobile configuration file, and can submit 326 the received data to a mobile application publisher for approval. In some implementations, the developer and/or mobile workbench cloud server 106 can submit the mobile configuration file for the initial approval of the application, and can send the mobile configuration file directly to users after subsequent updates to the mobile configuration file; in other implementations, the mobile configuration file itself can be excluded from the package provided to the mobile application publisher for approval, and the developer and/or mobile workbench cloud server 106 can send the mobile configuration file directly to users who install the mobile application 108, e.g., at the time of installation, and/or at another time.

Updating a Mobile Application with the Mobile Workbench

Figure 4:
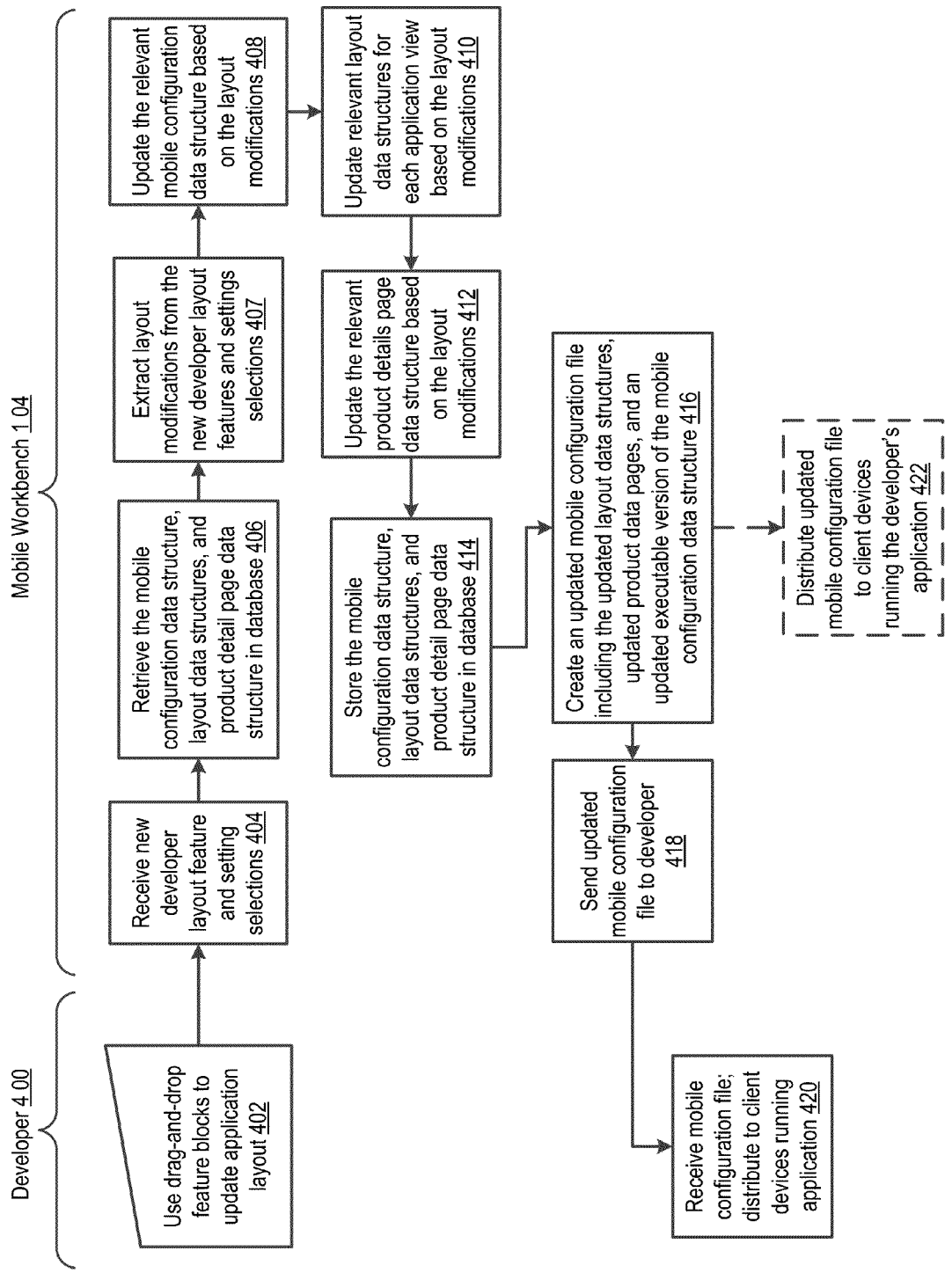
FIG. 4 is a logic flow diagram illustrating updating a mobile configuration file, according to an embodiment.

FIG. 4 is a logic flow diagram illustrating updating a mobile configuration data structure. For example, in some implementations, the developer 400 can use the mobile workbench 104 to edit previously-defined mobile application layouts. The developer, for example, can access previously-defined mobile application layouts from the mobile workbench 104, and can change properties of the layout. The mobile workbench 104 can then edit a stored copy of the mobile configuration file 120 corresponding to the edited mobile application layout, and can store the updated components of the mobile configuration file 120 in the mobile workbench database 134. The developer and/or the mobile workbench can then distribute the mobile configuration file 120, e.g., automatically, and/or in response to a request for an updated mobile configuration file 120 from a mobile application 108.

Figure 9:
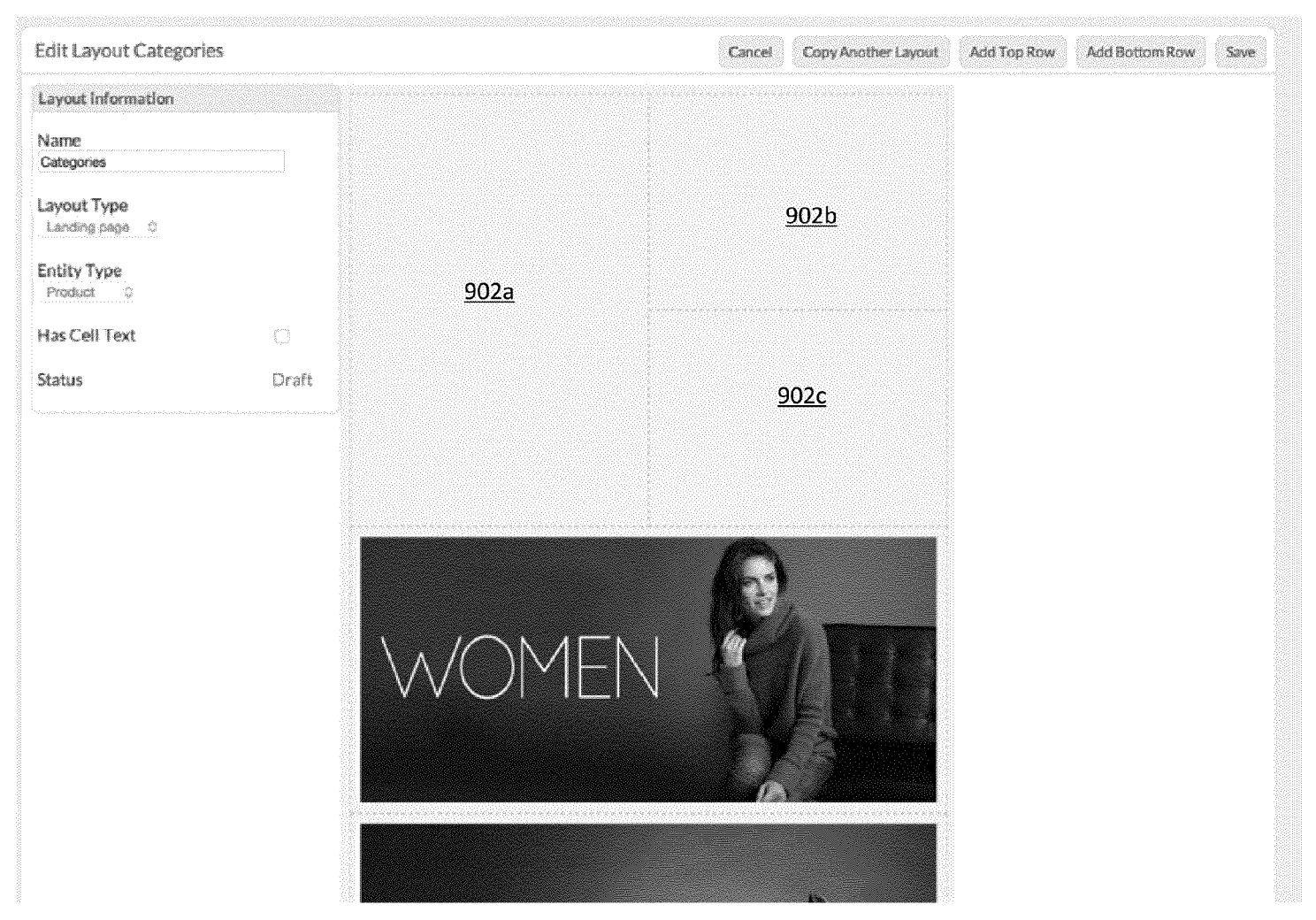

For example, referring to FIG. 9, the developer 400 can remove blocks previously included in the layout, and/or define new columns 902a and/or rows 902b-c. The developer can also split, add, and/or delete various particular cells within the layout. The developer 400 can also change colors, features, and/or similar options in the mobile workbench 104. Further, the developer can define actions and/or displayed images for various objects within each cell of the layout.

Figure 11:
FIG. 11 is a screenshot illustrating an updated layout for a mobile application, according to an embodiment.

Using FIG. 11 as an example, the developer 400 can change a variety of options to change mobile application layout 1108 into mobile application layout 1110. For example, the developer can change locations of the tab section, how a search option is displayed, the font and/or position of a page title and/or a merchant logo, and/or colors within one or more of the mobile application components.

Returning to FIG. 4, the developer 400 can change the mobile application layout by using the drag- and drop interface as shown in FIGS. 8-9 to update 402 the mobile application layout. As the developer updates the mobile application layout and/or after the developer had finished updating the mobile application layout, the mobile workbench 104 can receive 404 the new developer layout feature and setting selections. The mobile workbench cloud server 106 can also receive an application identifier, a merchant identifier, a mobile application identifier, and/or a similar identifier, which can be used to determine which data structures correspond to the mobile application layout the developer is editing.

The mobile workbench 104 can retrieve 406 the mobile configuration data structure, the layout data structures, and the product detail page data structures corresponding to the mobile application 108 (e.g., using the received identifier) from the mobile workbench database 134. The mobile workbench cloud server 106 can also extract 407 the layout modifications from the new developer layout features and settings selections, which can be used to modify the retrieved data structures. The mobile workbench cloud server 106 can, using the layout modifications, update 408 the mobile configuration data structure corresponding to the mobile application layout, update 410 the layout data structures corresponding to the mobile application layout, and update 412 the product details page data structure corresponding to the mobile application layout. The mobile workbench cloud server 106 can then store 414 the updated mobile configuration, layout, and product detail page data structures in the mobile workbench database 134, and can define 416 an updated mobile configuration file including the updated mobile configuration, layout, and product detail page data structures.

The updated mobile configuration file can be distributed 422 by the mobile workbench cloud server 106 to client devices 102 running the developer's mobile application 108, and/or the updated mobile configuration file can be sent 418 to the developer, such that the developer can receive and distribute 420 the mobile configuration file to client devices 102 running the developer's mobile application 108. For example, the developer and/or the mobile workbench cloud server 106 can keep track of which users have installed the mobile application 108, and/or which users' mobile application 108 installations have previously requested updated mobile configuration files, but have not received the most recent mobile configuration file. The developer and/or mobile workbench cloud server 106 can use this information to automatically issue updates to mobile application 108. In some implementations, the mobile application 108 itself can request an updated copy of the mobile configuration file from the developer and/or the mobile workbench cloud server 106, e.g., when the mobile application 108 initializes, when the mobile application 108 is shut down, in predetermined intervals of time, and/or under similar conditions (e.g., see at least FIGS. 5-6 for further details). In such cases, the mobile workbench cloud server 106 and/or the developer can choose to wait until a mobile application 108 requests an updated mobile configuration file, before sending the updated mobile configuration file to the mobile application 108.

Returning to FIG. 11, in some implementations, by receiving and processing an updated mobile configuration file, the mobile application 108 can render an updated interface 1110 with a modified set of features 1102, with a modified top bar 1104, and a modified lower bar 1106, without altering the underlying code within the mobile application 108.

Retrieving an Updated Mobile Configuration File with a Mobile Device

Figure 5:
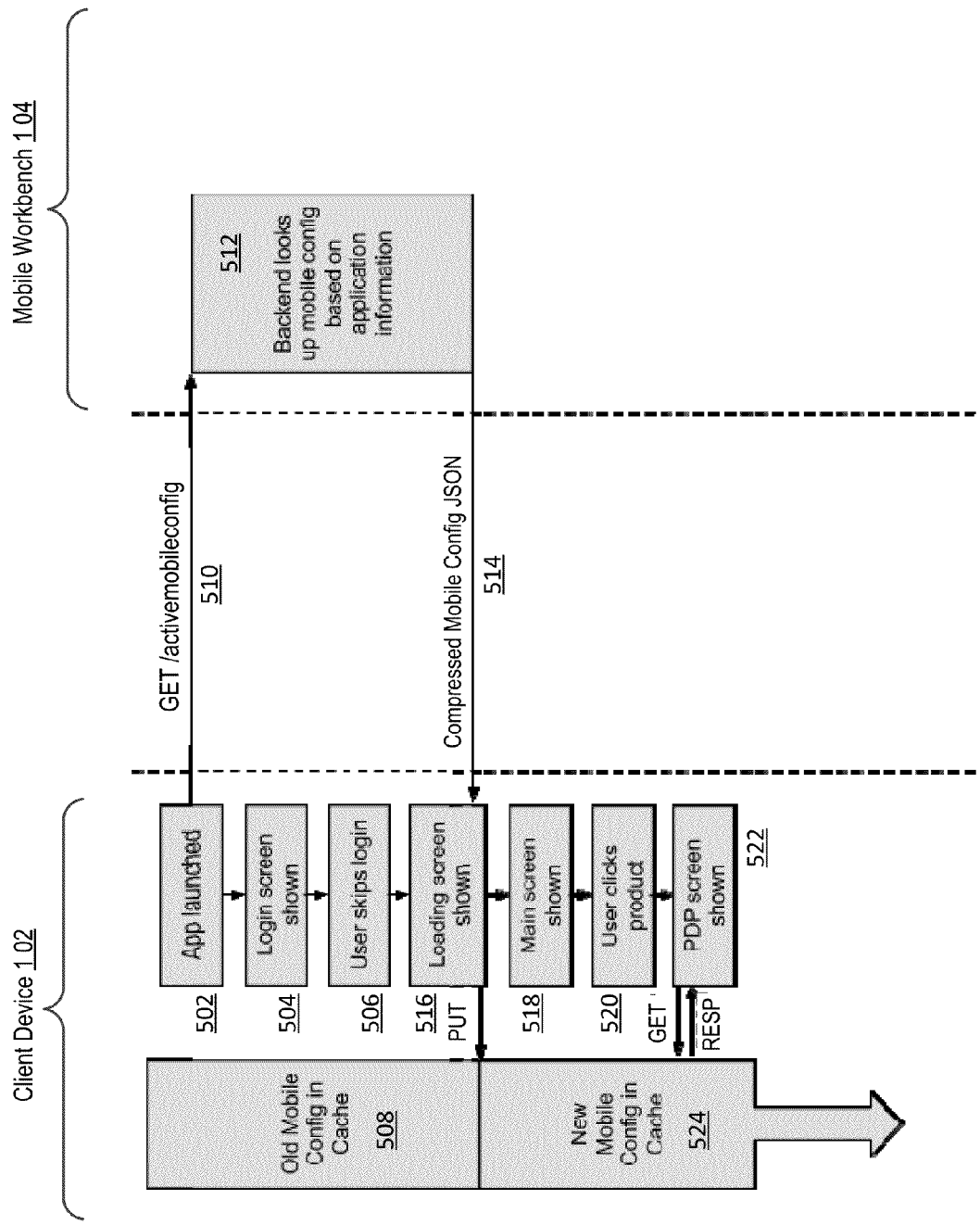
FIG. 5 is a logic flow diagram illustrating retrieving an updated mobile configuration file, according to an embodiment.

FIG. 5 is a logic flow diagram illustrating retrieving an updated mobile configuration file. For example, in some implementations, an old and/or initial mobile configuration file 508 can be stored in cache, e.g., when the mobile application 108 is installed, and/or during similar circumstances. When the mobile application is launched 502, the mobile application 108 can show a login screen 504, can allow a user to log into the application (or to skip the login screen, e.g., if the user wishes to use the application as a guest shopper), and/or to enter login credentials 506, and can reach a loading screen 516 for the mobile application 108. In the background, the mobile application 108 can send an HTTP(S) GET request 510 to the mobile workbench cloud server 106, e.g., requesting an updated mobile configuration file. The mobile workbench cloud server 106 can retrieve the mobile configuration file 512, e.g., based on identifying information provided in the request, which can match the mobile application 108 to the mobile configuration file being retrieved. The mobile workbench cloud server 106 can then send 514 the mobile configuration file to the mobile application 108, e.g., as a compressed JSON file and/or data structure, and/or in a similar format. In some implementations, instead of requesting a recent version of the mobile configuration file, the mobile application 108 may instead receive a copy of an updated mobile configuration file from a developer and/or from the mobile workbench cloud server 106.

Figure 6:
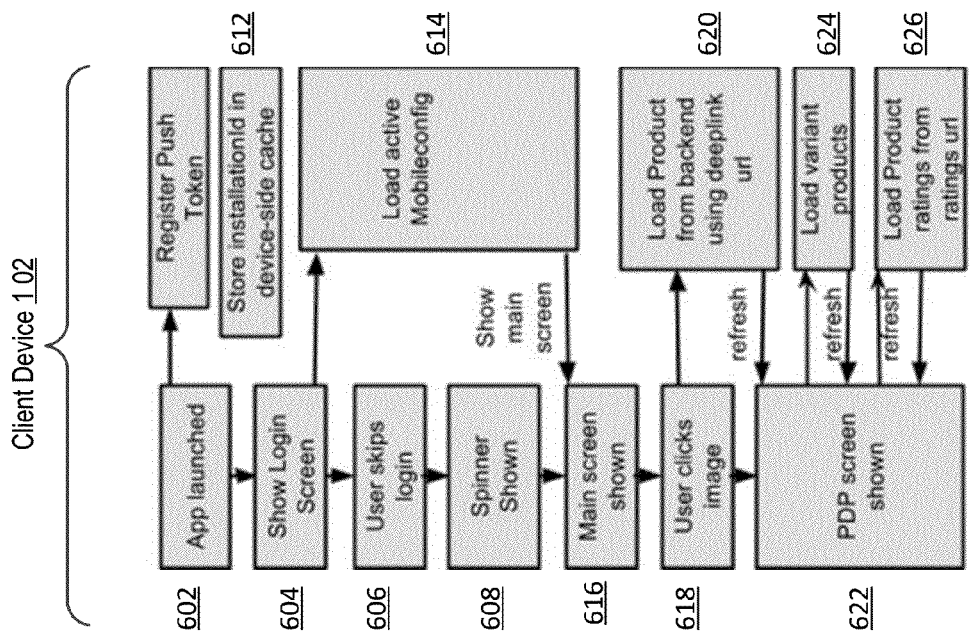
FIG. 6 is a logic flow diagram illustrating using an updated mobile configuration file, according to an embodiment.
Figure 7:
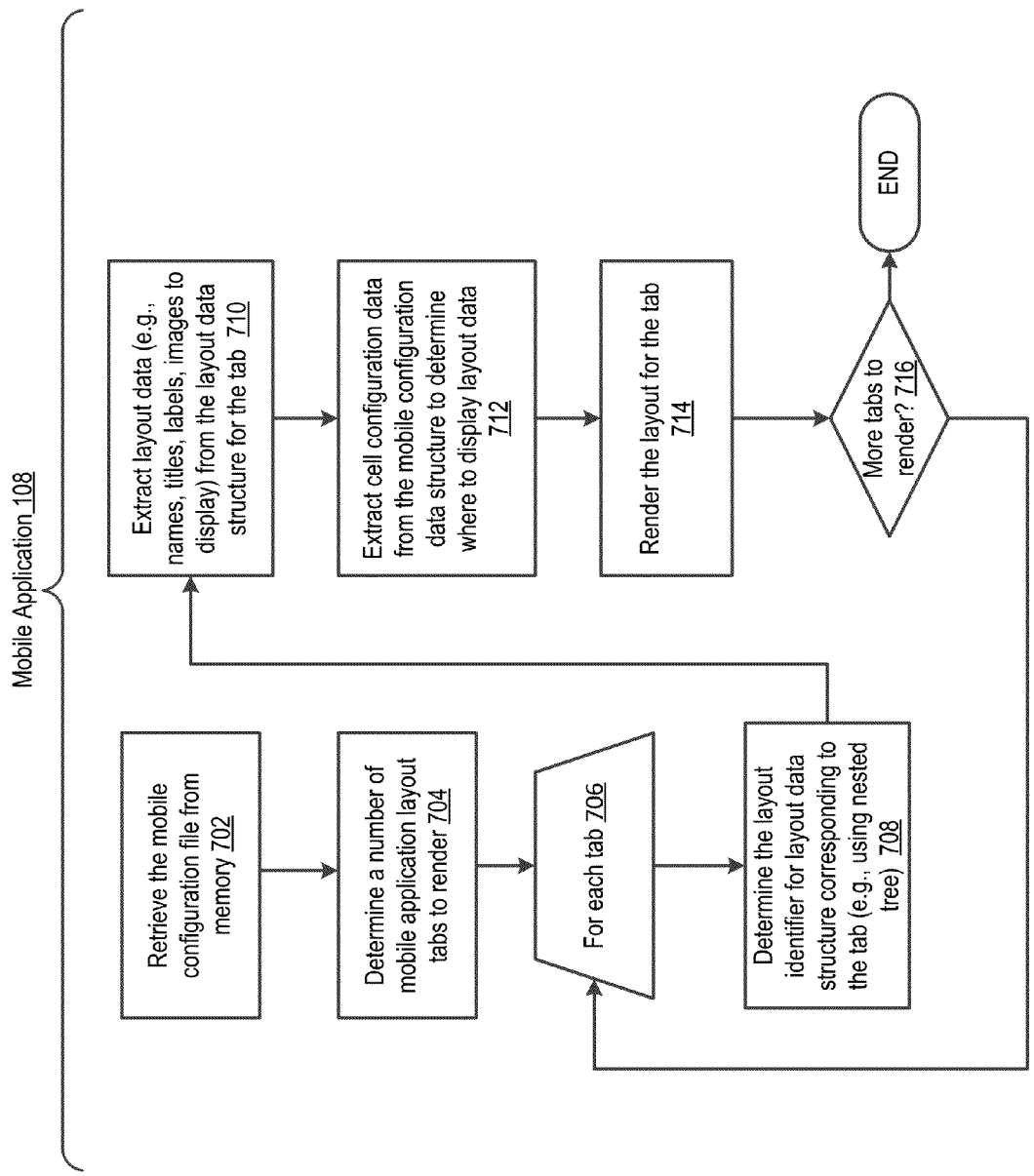
FIG. 7 is a logic flow diagram illustrating native rendering of a mobile configuration file, according to an embodiment.

After the mobile application 108 has received an updated and/or new mobile configuration file 524, the mobile application 108 can render the main screen 518 of the mobile application 108, e.g., by using the mobile configuration file to determine how to construct the main screen layout (e.g., see at least FIGS. 6-7 for more details). The user can then interact with the mobile application 108 (e.g., by selecting products to view and/or purchase, and/or similar actions) 520, and can view product detail pages 522 of each of the products that the user selects for viewing.

Using an Updated Mobile Configuration File with a Mobile Device

FIG. 6 is a logic flow diagram illustrating using an updated mobile configuration file. In some implementations, for example, a mobile application 108 can launch 602, and can show a login screen 604. The user can login and/or skip the login screen 606, and the mobile application 108 can show a loading screen 608, e.g., such as a spinner screen and/or a similar loading screen. Substantially simultaneously, the client device 102 can store an installationID 612 received (e.g., via a mobile platform API and/or a similar mechanism) from the mobile workbench cloud server 106 on the client device 102. The mobile application 108 can load an active and/or current mobile configuration file 614, allowing the mobile application to render a main mobile application 108 screen 616. If a user who has the mobile application 108 stored on her client device 102, clicks an image 618, and/or a similar mobile application asset, the mobile application 108 can load product information 620, e.g., via using a deep link address to product details in the mobile workbench database 134, and can refresh its interface once the product information has been received. The mobile application 108 can then render a product detail page 622, e.g., using the retrieved product details to populate the product detail page layout. The mobile application 108 can also retrieve product variants 624 and product ratings and/or reviews 626, and display this data to the user through the mobile application 108, e.g., upon a mobile application refresh.

FIG. 7 is a logic flow diagram illustrating native rendering of a mobile configuration file, according to an embodiment. For example, in some embodiments, a mobile application 108 can retrieve 702 a mobile configuration file, e.g., from memory and/or a similar data storage module on a user's mobile device. The mobile application 108 can determine 704 a number of application layout tabs will be rendered, e.g., using the number of layout data structures in the mobile configuration file. The mobile application 108 can, for each tab 706, determine the layout identifier 708 for each of the layout data structures 204 which corresponds to the tab (e.g., by traversing a nested tree data structure created from the mobile configuration file). Each tab can have at least one corresponding layout data structure 204. The mobile application 108 can extract 710 layout data (e.g., names, titles, labels, images to display, and/or other such data) from the identified layout data structures for the tab, and can also extract 712 cell configuration data from the mobile configuration data structure 202 within the mobile configuration file, in order to determine information such as how many rows and/or columns are in the mobile application layout, which portions of the layout data appear in which cells of the mobile application layout, cell sizes and/or padding, and/or similar data. The mobile application 108 can execute a mobile configuration data structure object (e.g., the JSON version of the mobile application data structure 202) to render 714 the layout for the tab. The mobile application 108 can continue to analyze tab layout data if there are more tabs to render 716, until the mobile application 108 has determined how to render each of the tabs for the mobile application 108. In some implementations, the mobile application 108 may not determine how to render tabs in the mobile application 108 until the user has selected the tabs for viewing.

CONCLUSION

While various embodiments have been described and illustrated herein, a variety of other means and/or structures for performing the function and/or obtaining the results and/or one or more of the advantages described herein, and each of such variations and/or modifications is deemed to be within the scope of the disclosure. More generally, all parameters, dimensions, materials, and configurations described herein are meant to be examples and that the actual parameters, dimensions, materials, and/or configurations will depend upon the specific application or applications. It is, therefore, to be understood that the foregoing embodiments are presented by way of example only.

The above-described embodiments can be implemented in any of numerous ways. For example, embodiments of designing and making the mobile configuration files and mobile application layouts disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the mobile configuration files and mobile application layouts disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the disclosure discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods described herein need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various aspects of the description discussed herein may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for rendering a mobile application executing on a mobile device, the method comprising:
   receiving a notification from a mobile application indicating that the mobile application has been initiated;
   extracting application identification information from the notification;
   retrieving at least one platform-agnostic mobile application configuration data structure from a memory based on the application identification information, the at least one mobile application configuration data structure including platform-agnostic mobile application layout settings data and a platform-agnostic layout settings executable object, the platform-agnostic mobile application configuration data structure configured to instruct the mobile application to render a graphical user interface on a display of a mobile device based on the platform-agnostic mobile application layout settings data and execution of the platform-agnostic layout settings executable object;
   sending the at least one platform-agnostic mobile application configuration data structure to the mobile application so as to cause mobile device to render the graphical user interface on the display according to the at least one platform-agnostic mobile application configuration data structure;
   receiving a request to modify the platform-agnostic layout settings executable object from a mobile workbench;
   modifying the platform-agnostic layout settings executable object based on data in the request to define a modified platform-agnostic mobile application configuration data structure, the modified platform-agnostic mobile application configuration data structure configured to instruct the mobile application to render a modified graphical user interface on the display of based on the modified platform-agnostic mobile application layout settings data and execution of the platform-agnostic layout settings executable object; and
   sending the modified platform-agnostic mobile application configuration data structure to the mobile application.

2. The method of claim 1, wherein sending the at least one at least one platform-agnostic mobile application configuration data structure to the mobile application causes the mobile device to render the graphical user interface by instructing the mobile application to access the at least one platform-agnostic mobile application configuration data structure.

3. The method of claim 1, wherein sending the at least one at least one platform-agnostic mobile application configuration data structure to the mobile application causes the mobile device to render the graphical user interface without altering code implementing the mobile application.

4. The method of claim 1, wherein the at least one platform-agnostic mobile application configuration data structure includes a plurality of layouts and a plurality of configuration settings.

5. The method of claim 1, wherein the platform-agnostic layout settings executable object is a JavaScript Object Notation (JSON) object executable by the mobile application.

6. The method of claim 1, wherein the platform-agnostic layout settings executable object specifying at least one of settings and features of the mobile application.

7. The method of claim 6, wherein the settings include at least one of color settings, image display settings, font settings, search layout settings, grid layout settings, shopping cart settings, and update settings.

8. The method of claim 6, wherein the features of the mobile application are specified via feature flags in the platform-agnostic layout settings executable object.

9. The method of claim 6, wherein the features of the mobile application include at least one of a barcode feature, a save picture feature, a notifications feature, a search refinement feature, a ratings feature, a geofencing feature, a wishlist creation and management feature, a checkout feature, and a store locator feature.

10. The method of claim 1, wherein the notification is a first notification and the mobile application is a first instance of the mobile application, the method further comprising:
receiving a second notification from a second instance of the mobile application indicating that the second instance of the mobile application has been initiated;
extracting a configuration data structure version identifier from the second notification;
retrieving at least one platform-agnostic mobile application configuration data structure from a memory based on the configuration data structure version identifier; and
sending the at least one platform-agnostic mobile application configuration data structure to the second instance of the mobile application.

11. The method of claim 1, wherein the platform-agnostic layout settings data includes Operating System mapping settings.

12. The method of claim 1, further comprising:
extracting from the request at least one setting or feature modification for at least one setting or feature; wherein
defining the modified platform-agnostic mobile application configuration data structure includes modifying the at least one setting or feature within platform-agnostic layout settings executable object code.

13. The method of claim 1, wherein the modified platform-agnostic mobile application configuration data structure is configured to instruct the mobile application to render the modified graphical user interface on a display of the mobile device when the mobile application is initiated.

14. The method of claim 1, wherein
the modified platform-agnostic mobile application configuration data structure is configured to instruct the mobile application to refresh the graphical user interface such that the mobile application renders the modified graphical user interface on a display of the mobile device.

15. An apparatus for modifying a mobile application layout, the method comprising:
a memory configured to store processor-executable code; and
a processor operatively coupled to the memory and configured to execute processor-executable code to:
receive a request to modify a mobile application configuration file for a mobile application from a mobile workbench executed on an administrative device;
extract, from the request, at least one layout modification for the mobile application configuration file;
extract, from the request, application identification information;
retrieve, from the memory, mobile application configuration file information based on the application identification information, the at least one mobile application configuration file information including mobile application layout settings data and a mobile application layout settings executable object; and
modify at least one of the mobile application layout settings data or the mobile application layout settings executable object, using the layout modification extracted from the request, to define a modified mobile application configuration file, the modified mobile application configuration file configured to instruct a mobile application to render a graphical user interface on a display for a mobile device based on the modification to at least one of the mobile application layout settings data or the mobile application layout settings executable object, and execution of the mobile application layout settings executable object, without altering the code in the mobile application.

16. The apparatus of claim 15, the processor further configured to execute processor-executable code to:
distribute the modified mobile application configuration file to a plurality of mobile devices.

17. The apparatus of claim 16, wherein each mobile device from the plurality of mobile devices includes an installed copy of the mobile application.

18. The apparatus of claim 15, the processor further configured to execute processor-executable code to:
receive a signal from the mobile workbench to distribute the modified mobile application configuration file to a plurality of mobile devices; and
distribute the modified mobile application configuration file to the plurality of mobile devices.

19. The apparatus of claim 15, the processor further configured to execute processor-executable code to:
send the modified mobile application configuration file to the mobile workbench.

20. The apparatus of claim 15, wherein the mobile workbench comprises an interface configured to receive layout modifications from a mobile application administrator.

21. The apparatus of claim 15, wherein the modified mobile application configuration file is configured to instruct the mobile application to render a graphical user interface for the mobile application when the mobile application is initiated on a client device.

22. The apparatus of claim 15, wherein:
the graphical user interface is a second graphical user interface, and
the modified mobile application configuration file is configured to instruct the mobile application to render the second graphical user interface on the display of the mobile device after a first graphical user interface is refreshed.

23. A method for modifying a mobile application layout, comprising:
displaying a plurality of graphical representations of feature blocks within a mobile workbench;
receiving an indication that an administrator has selected at least one of the plurality of graphical representations of feature blocks;
sending the at least one of the plurality of graphical representations of feature blocks and a platform identifier to a server so as to cause the server to generate a mobile application configuration data structure for a mobile application executable object, based on the administrator's selections, the mobile application configuration data structure including platform-agnostic mobile application layout settings data and a platform-agnostic layout settings executable object, the platform-agnostic mobile application configuration data structure configured to instruct the mobile application executable object to render a graphical user interface on a display of a mobile device based on the platform-agnostic mobile application layout settings data and execution of the platform-agnostic layout settings executable object;

receiving a request from the administrator to modify the mobile application configuration data structure for the mobile application executable object;

extracting, from the request, at least one layout modification for at least one mobile application configuration data structure element; and modifying the mobile application configuration data structure, using the layout modification extracted from the request, to define a modified mobile application configuration data structure, the modified mobile application configuration data structure configured to instruct a mobile application to render a graphical user interface on a display for a mobile device based on the layout modification and without altering the code in the mobile application executable object.

* * * * *